US008624928B2

(12) United States Patent  
Chang

(10) Patent No.: US 8,624,928 B2
(45) Date of Patent: Jan. 7, 2014

(54) SYSTEM AND METHOD FOR MAGNIFYING A WEBPAGE IN AN ELECTRONIC DEVICE

(75) Inventor: Wan-Chien Chang, New Taipei (TW)

(73) Assignee: Chi Mei Communication Systems, Inc., New Taipei (TW)

(*) Notice: Subject to any disclaimer, the term of this patent is extended or adjusted under 35 U.S.C. 154(b) by 172 days.

(21) Appl. No.: 13/267,899

(22) Filed: Oct. 7, 2011

(65) Prior Publication Data
US 2013/0002720 A1 Jan. 3, 2013

(30) Foreign Application Priority Data

Jun. 28, 2011 (TW) .............................. 100122547 A

(51) Int. Cl.
G09G 5/00 (2006.01)
(52) U.S. Cl.
USPC ........................................................ 345/661
(58) Field of Classification Search
None
See application file for complete search history.

(56) References Cited

U.S. PATENT DOCUMENTS

| 7,286,145 | B2* | 10/2007 | Sunata | 345/671 |
| 2009/0135147 | A1* | 5/2009 | Hsu et al. | 345/173 |
| 2010/0134641 | A1* | 6/2010 | Marti et al. | 348/222.1 |
| 2010/0146436 | A1* | 6/2010 | Jakobson et al. | 715/800 |
| 2010/0302281 | A1* | 12/2010 | Kim | 345/661 |
| 2011/0018695 | A1* | 1/2011 | Bells et al. | 340/407.2 |
| 2011/0043517 | A1* | 2/2011 | Schneider et al. | 345/419 |

* cited by examiner

Primary Examiner — David Zarka
Assistant Examiner — Khoa Vu
(74) Attorney, Agent, or Firm — Altis Law Group, Inc.

(57) ABSTRACT

A system and method for magnifying a webpage displayed on a touch screen of an electronic device includes defining a magnification instruction for magnifying content of the webpage on the touch screen, a trigger instruction for each of an automatic mode and a manual mode. The method detects an input instruction according to user input if the electronic device browses webpage. A selected magnification mode is confirmed according to the trigger instruction detected by the electronic device if the electronic device has detected the magnification instruction. The method further confirms a target area to be magnified in the webpage on the touch screen according to the selected magnification mode, and magnifies content of the target area by displaying content of the target area on a full screen of the touch screen.

12 Claims, 4 Drawing Sheets

SYSTEM AND METHOD FOR MAGNIFYING A WEBPAGE IN AN ELECTRONIC DEVICE

BACKGROUND

1. Technical Field

Embodiments of the present disclosure relate to webpage display systems, and particularly to a system and method for magnifying a webpage in an electronic device.

2. Description of Related Art

A touch screen of an electronic device is generally limited in size. When using the electronic device to browse a webpage, because of the size of the touch screen, the webpage displayed on the touch screen sometimes needs to be magnified for easy viewing of display content of the webpage. However, it may be difficult to locate the desired display content of the webpage after the webpage has been magnified.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
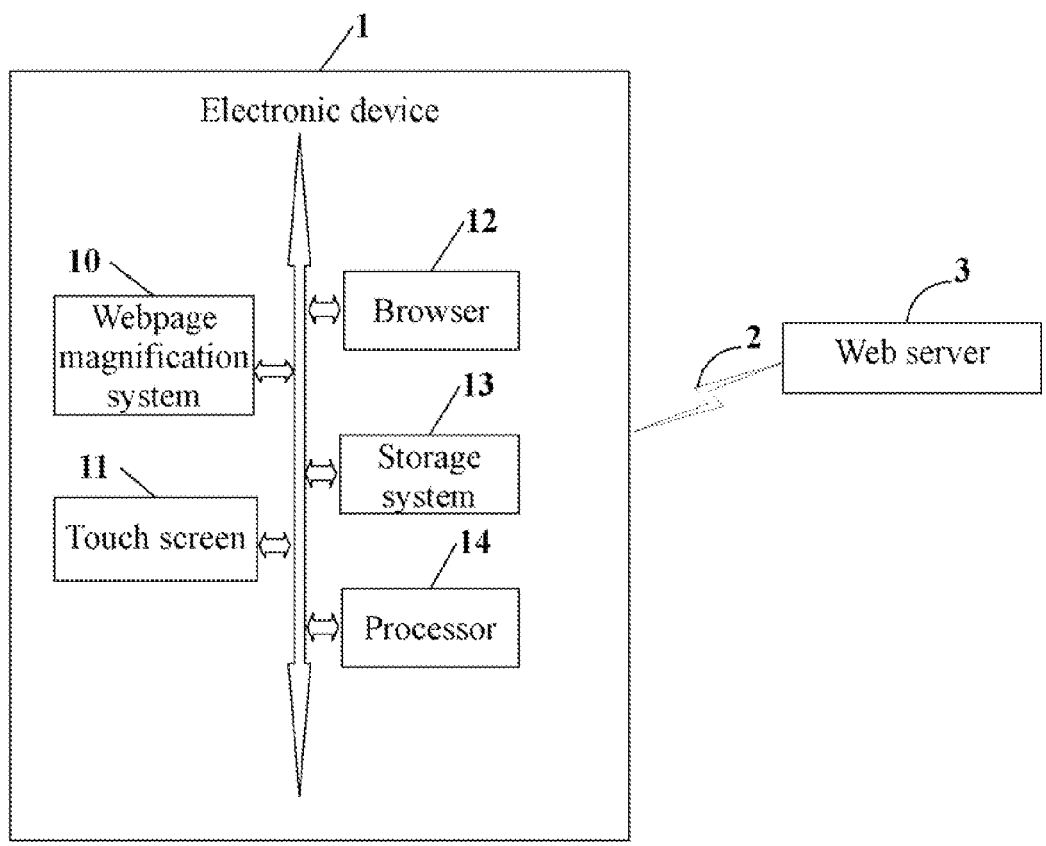
FIG. 1 is a schematic diagram of one embodiment of an electronic device including a webpage magnification system.

FIG. 1 is a schematic diagram of one embodiment of an electronic device 1 including a webpage magnification system 10. The electronic device 1 further includes a touch screen 11 and a browser 12. The electronic device 1 communicates with a web server 3 through a wireless network 2, and is enabled to browse the webpage by sending a request to the web server 3 through the browser 12. The webpage magnification system 10 is enabled to magnify a target area of the browsed webpage displayed on the touch screen 11 efficiently and appropriately.

The touch screen 11 may display various data of the electronic device 1, such as, the webpage, for example. In the embodiment, the touch screen 11 can be a resistive touch screen, or a capacitive touch screen. The web server 3 may be a Wireless Application Protocol web server. The electronic device 1 may be a mobile phone, a computer, or a MP4 player, for example.

The electronic device 1 further includes a storage system 13 and at least one processor 14. The storage system 13 stores various data of the electronic device 1. The storage system 13 may be a memory of the electronic device 1, or an external storage card, such as a smart media card, or a secure digital card. The at least one processor 14 executes one or more computerized codes and other applications of the electronic device 1, to provide the functions of the webpage magnification system 10.

Figure 2:
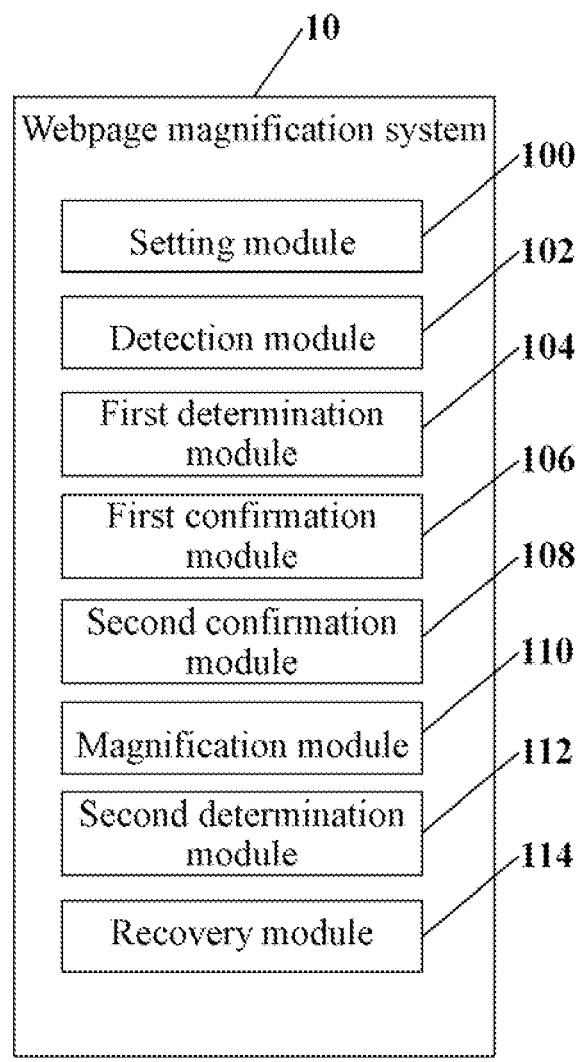
FIG. 2 is a block diagram of function modules of the webpage magnification system included in the electronic device of FIG. 1.

FIG. 2 is a block diagram of function modules of the webpage magnification system 10 included in the electronic device 1 of FIG. 1. In the embodiment, the webpage magnification system 10 may include a setting module 100, a detection module 102, a first determination module 104, a first confirmation module 106, a second confirmation module 108, a magnification module 110, a second determination module 112, and a recovery module 114. The modules 100, 102, 104, 106, 108, 110, 112, and 114 comprise computerized codes in the form of one or more programs that are stored in the storage system 13. The computerized code includes instructions that are executed by at least one processor 14 to provide functions for the modules. Details of these operations are as follows.

The setting module 100 defines a magnification instruction that is used for magnifying content of the webpage displayed on the touch screen 11, and defines a return instruction for returning to display the webpage before the webpage is magnified on the touch screen 11. The setting module 100 further defines trigger instructions for magnification modes (including an automatic mode and a manual mode) of the webpage. In one embodiment, the automatic mode is a mode that divides the webpage into a plurality of sections automatically, and confirming a section as a target area to be magnified according to user selection. The manual mode represents a mode that allows the user to randomly choose and confirm the target area on the webpage to be magnified. In one embodiment, the setting module 100 may set a plurality of keys or virtual keys of the electronic device 1 to invoke the magnification instruction, the return instruction, and the trigger instructions.

Figure 3:
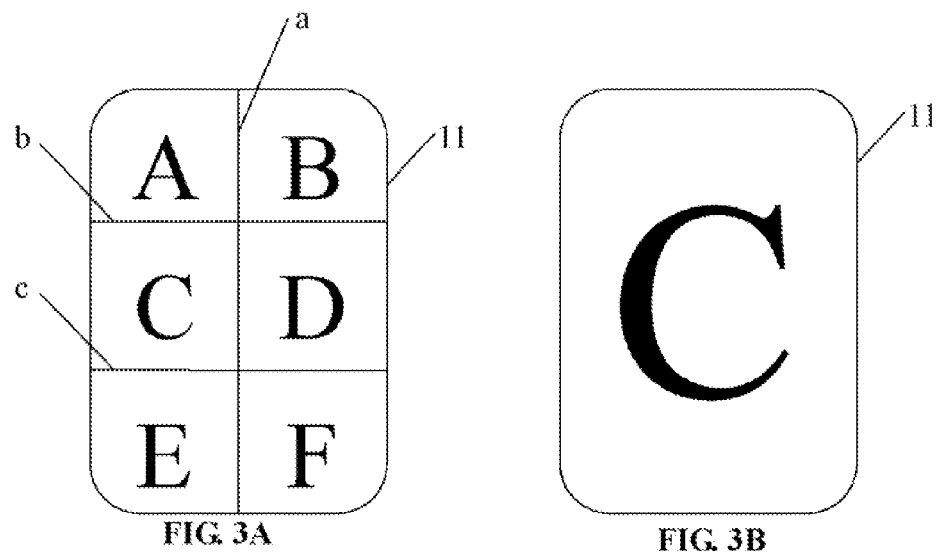
FIG. 3A, FIG. 3B, FIG. 3C, FIG. 3D, and FIG. 3E are exemplary magnification modes illustrations.
Figure 3:
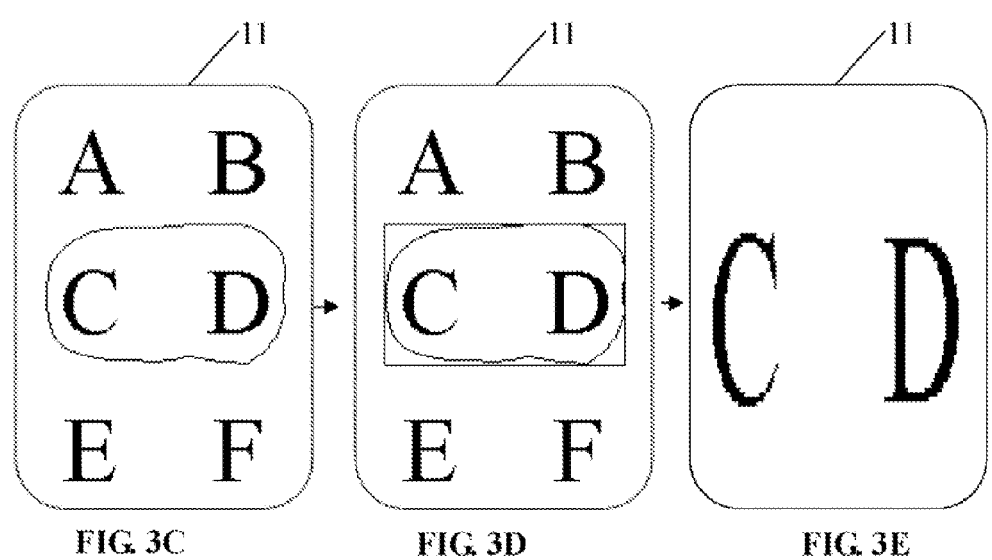

The setting module 100 further sets the webpage to be divided into N*M sections for the automatic mode. "N" represents a number of horizontal sections of the webpage, and "M" represents a number of vertical sections of the webpage. As shown in FIG. 3A, the setting module 100 may set the webpage to be divided into "2*3" sections. Therefore, the webpage on the touch screen 11 may be divided into six sections.

The detection module 102 detects input instructions according to user input after the electronic device 1 requests the web server 3 to browse the webpage using the browser 12 and the touch screen 11 displays the webpage. The input instructions may include the magnification instruction, the return instruction, and the trigger instruction for the automatic mode and the manual mode.

The first determination module 104 determines whether the electronic device 1 has detected the magnification instruction according to the detected input instruction.

The first confirmation module 106 confirms a selected magnification mode according to the trigger instruction detected by the electronic device 1. In one embodiment, if the electronic device 1 has detected the trigger instruction for the automatic mode, the first confirmation module 106 confirms that the selected magnification mode is the automatic mode. If the electronic device 1 has detected the trigger instruction for the manual mode, the first confirmation module 106 confirms that the selected magnification mode is the manual mode.

The second confirmation module 108 confirms a target area to be magnified in the webpage on the touch screen 11, according to the selected magnification mode and touch operations on the touch screen 11 from the user. Details of confirming the target area are as follows.

The magnification module 110 magnifies the content of the target area by displaying enlarging content of the target area to fit a screen size of the touch screen 11 (e.g., a full screen).

In one embodiment, if the selected magnification mode is the automatic mode, the second confirmation module 108 confirms the target area by the following steps. In one embodiment, a resolution of the touch screen 11 is "A*B", where "A" represents horizontal pixels of the resolution, and "B" represents vertical pixels of the resolution. The second confirmation module 108 divides the webpage on the touch screen 11 into the "N*M" sections by marking the horizontal pixels of "(A÷N)", "(A÷N)*2", . . . , and "(A÷N)*(N−1)" with a predetermined color, and by marking the vertical pixels of "(B÷M)", "(B÷M)*2", . . . , and (B÷M)*(M−1)" with another predetermined color. The second confirmation module 108 records a trigger range for each of the sections, according to ranges of the horizontal pixels and the vertical pixels on the touch screen 11 of each section. The user may long press on any position of the touch screen 11 with a finger or a stylus, to select one section to be magnified. Long press is defined as pressing on the touch screen 11 for a few seconds, such as, pressing for 2 seconds, for example. The selected section may be confirmed according to an X coordinate value and a Y coordinate value of a touch point of the long press on the touch screen 11 and the trigger range for each of the sections. The second confirmation module 108 confirms the selected section to be the target area. In one embodiment, after the webpage has been divided into the "N*M" sections, if the user just tap on the touch screen 11, and not long press on the touch screen 11, the selected section will not be confirmed.

As shown in FIG. 3A, if the resolution of the touch screen 11 is "320*480" and the setting module 100 sets the webpage to be divided into "2*3" sections, the second confirmation module 108 marks the horizontal pixel of "160" with the predetermined color (e.g., a red color), such as line "a" in the FIG. 3A, for example. The second confirmation module 108 further marks the vertical pixels of "160" and "320" with the another predetermined color, such as line "b" and line "c" in the FIG. 3A. The webpage on the touch screen 11 is divided into six sections. If the user long presses on the touch screen 11 to select a section of the second row and the first line, as shown in FIG. 3B, content of the selected section will display on the full screen of the touch screen 11.

If the selected magnification mode is the manual mode, the user may continuously draw (slide) a finger across the touch screen 11 to generate a closed path. The closed path has successive coordinate values on the touch screen 11 and a starting point and an ending point of the successive coordinates are same or substantially the same. The second confirmation module 108 confirms the target area by the following steps. The second confirmation module 108 records successive coordinate values (X coordinate values and Y coordinate values) of the closed path drawn on the touch screen 11, and displays the pixels on the touch screen 11 that correspond to the successive coordinate values with the predetermined color. The second confirmation module 108 confirms a rectangular area according to a minimum value of X coordinate values (denoted as Xmin), a maximum value of X coordinate values (denoted as Xmax), a minimum value of Y coordinate values (denoted as Ymin), and a maximum value of Y coordinate values (denoted as Ymax) from the recorded successive coordinate values. Four vertices of the rectangular include the vertex at the upper left corner (Xmin, Ymax), the vertex at the lower left corner (Xmin, Ymin), the vertex at the upper right corner (Xmax, Ymax), and the vertex at the lower right corner (Xmax, Ymin). The second confirmation module 108 confirms the rectangular area to be the target area. In one embodiment, if the user just taps on the touch screen 11, or not operate the closed path, the rectangular area may not be confirmed.

For example, the closed path slid out on the touch screen 11 is shown in FIG. 3C. As shown in FIG. 3D, the second confirmation 108 confirms the rectangular area according to the successive coordinate values of the closed path. As shown in FIG. 3E, the magnification module 110 displays content in the rectangular area on the full screen of the touch screen 11.

The second determination module 112 determines whether the electronic device 1 has detected the return instruction, after the content in the target area is magnified.

The recovery module 114 returns to display the webpage before the target area is magnified on the touch screen 11, upon the condition that the electronic device 1 has detected the return instruction.

Figure 4:
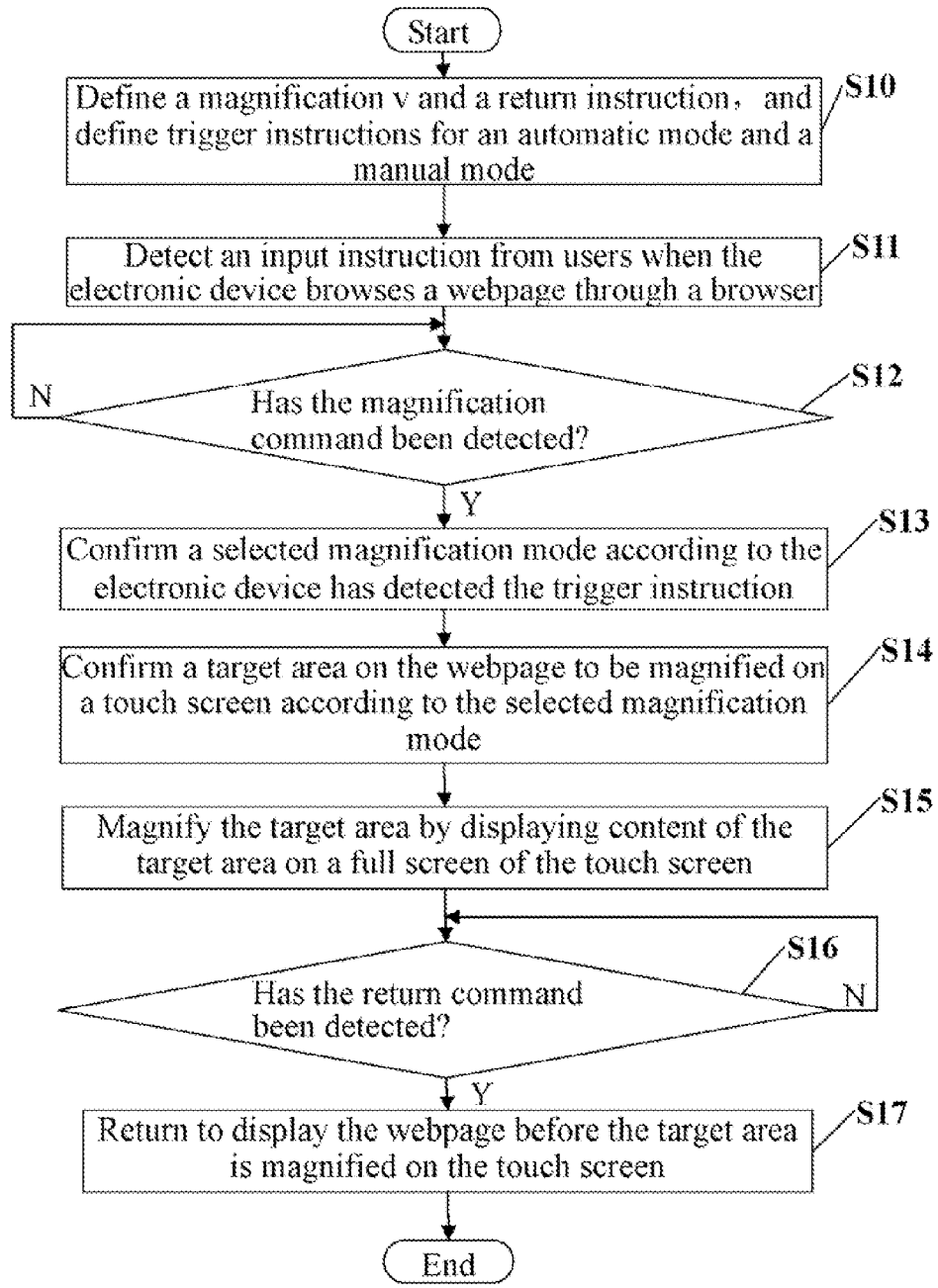
FIG. 4 is a flowchart of one embodiment of a method for magnifying a webpage in an electronic device, such as, that of FIG. 1.

FIG. 4 is a flowchart of one embodiment of a method for magnifying a webpage in an electronic device. Depending on the embodiment, additional blocks may be added, others deleted, and the ordering of the blocks may be changed.

In block S10, the setting module 100 defines a magnification instruction that is used for magnifying content of a webpage displayed on the touch screen 11, a return instruction for return to display the webpage on the touch screen 11, trigger instructions for magnification modes (including an automatic mode and a manual mode), and sets the webpage to be divided into "N*M" sections. In one embodiment, the automatic mode is a mode that divides the webpage into a plurality of sections automatically, and confirming a section as a target area to be magnified according to user selection. The manual mode represents a mode that allows the user to randomly choose and confirm the target area on the webpage to be magnified.

In block S11, when the electronic device 1 requests browsing webpage from the web server 3 through the browser 12 and the touch screen 11 displays the webpage, the detection module 102 detects an input instruction according to user input. The input instruction may include the magnification instruction, the return instruction, or the trigger instruction for the automatic mode or the manual mode.

In block S12, the first determination module 104 determines whether the electronic device 1 has detected the magnification instruction according to the detected input instruction. If the electronic device 1 has detected the magnification instruction, block S13 is implemented. Otherwise, if the electronic device 1 has not detected the magnification instruction, block S12 is repeated.

In block S13, the first confirmation module 106 confirms a selected magnification mode according the trigger instruction detected by the electronic device 1. In one embodiment, if the electronic device 1 has detected the trigger instruction for the automatic mode, the first confirmation module 106 confirms that the selected magnification mode is the automatic mode. If the electronic device 1 has detected the trigger instruction for the manual mode, the first confirmation module 106 confirms that the selected magnification mode is the manual mode.

In block S14, the second confirmation module 108 confirms a target area on the webpage to be magnified on the touch screen 11 according to the selected magnification mode.

In the block S14, if the selected magnification mode is the automatic mode, and the resolution of the touch screen 11 is "A*B". The second confirmation module 108 divides the webpage into "N*M" sections by marking the horizontal pixels of "(A÷N)", "(A÷N)*2", . . . , and "(A÷N)*(N−1)" with a predetermined color, and by marking the vertical pixels of "(B÷M", "(B÷M)*2", . . . , and (B÷M)*(M−1)" with another predetermined color. The second confirmation module 108 records a trigger range for each of the sections, according to ranges of the horizontal pixels and the vertical pixels on the touch screen 11 of each section. The selected section may be confirmed according to receiving an X coordinate value and a Y coordinate value of a touch point of the long press on the touch screen 11 and the trigger range for each of the sections. The second confirmation module 108 confirms the selected section as a target area to be magnified.

If the selected magnification mode is the manual mode, the user may continuously draw (slide) a finger across the touch screen 11 to generate a closed path. The second confirmation module 108 records successive coordinate values (X coordinate values and Y coordinate values) of the closed path drawn on the touch screen 11, and displays the pixels on the touch screen 11 that correspond to the successive coordinate values with the predetermined color. The second confirmation module 108 confirms a rectangular area according to a minimum value of X coordinate values (denoted as Xmin), a maximum value of X coordinate values (denoted as Xmax), a minimum value of Y coordinate values (denoted as Ymin), and a maximum value of Y coordinate values (denoted as Ymax) from the recorded successive coordinate values. Four vertices of the rectangular include the vertex at the upper left corner (Xmin, Ymax), the vertex at the lower left corner (Xmin, Ymin), the vertex at the upper right corner (Xmax, Ymax), and the vertex at the lower right corner (Xmax, Ymin). The second confirmation module 108 confirms the rectangular area to be the target area.

In block S15, the magnification module 110 magnifies content of the target area by displaying enlarging content of the target area to fit a screen size of the touch screen 11 (e.g., "full screen).

In block S16, the second determination module 112 determines whether the electronic device 1 has detected the return instruction, after the content in the target area is magnified. If the electronic device 1 has detected the return instruction, block S17 is implemented. Otherwise, if the electronic device 1 has not detected the return instruction, block S16 is repeated.

In block S17, the recovery module 114 returns to display the webpage before the target area is magnified on the touch screen 11, upon the condition that the electronic device 1 has detected the return instruction.

It should be emphasized that the described exemplary embodiments are merely possible examples of implementations, and have been set forth for a clear understanding of the principles of the present disclosure. Many variations and modifications may be made to the-described exemplary embodiments without departing substantially from the spirit and principles of the present disclosure. All such modifications and variations are intended to be included herein within the scope of this disclosure and the described inventive embodiments, and the present disclosure is protected by the following claims.

What is claimed is:

1. A computerized method of magnifying a webpage displayed on a touch screen of an electronic device, the method comprising:

defining a magnification instruction that allows for magnification of content of the webpage on the touch screen, and trigger instructions for magnification modes of the webpage, the magnification mode comprising an automatic mode and a manual mode;

dividing the webpage into "N*M" sections in the automatic mode, "N" representing a number of horizontal sections of the webpage, and "M" representing a number of vertical sections of the webpage;

detecting an input instruction according to user input;

confirming a selected magnification mode according to detection of the trigger instruction by the electronic device, upon the condition that the electronic device has detected the magnification instruction;

confirming a target area on the webpage to be magnified on the touch screen by dividing the webpage into the "N*M" sections according to a resolution "A*B" of the touch screen, "A" representing horizontal pixels of the resolution, "B" representing vertical pixels of the resolution; recording a trigger range for each of the sections according to ranges of the horizontal pixels and the vertical pixels on the touch screen of each section; confirming a selected section according to receiving an X coordinate value and a Y coordinate value of a touch point long pressed on the touch screen and the trigger range for each of the sections, confirming the selected section to be the target area, if the selected magnification mode is the automatic mode; or confirming the target area by recording successive coordinate values comprising X coordinate values and Y coordinate values of the touch screen according to a closed path drawn on the touch screen; displaying pixels on the touch screen that correspond to the successive coordinate values with a predetermined color; confirming a rectangular area according to a minimum value of X coordinate values, a maximum value of X coordinate values, a minimum value of Y coordinate values, and a maximum value of Y coordinate values from the recorded successive coordinate values, and confirming the rectangular area to be the target area, if the selected magnification mode is the manual mode;

magnifying content of the target area by displaying content of the target area on a full screen of the touch screen.

2. The method as claimed in claim 1, further comprising:

defining a return instruction for returning to display the webpage before the target area is magnified on the touch screen.

3. The method as claimed in claim 2, further comprising:

returning to display the webpage before the target area is magnified on the touch screen, in response to that the electronic device has detected the return instruction.

4. The method as claimed in claim 2, wherein the selected magnification mode is confirmed by:

confirming that the selected magnification mode is the automatic mode, upon the condition that the electronic device has detected the trigger instruction for the automatic mode;

confirming that the selected magnification mode is the manual mode, upon the condition that the electronic device has detected the trigger instruction for the manual mode.

5. A non-transitory storage medium storing a set of instructions, the set of instructions capable of being executed by a processor of an electronic device, cause the electronic device to perform a method of magnifying a webpage displayed on a touch screen of the electronic device, the method comprising:

defining a magnification instruction that allows for magnification of content of the webpage on the touch screen, and trigger instructions for magnification modes of the webpage, the magnification mode comprising an automatic mode and a manual mode;

dividing the webpage into "N*M" sections in the automatic mode, "N" representing a number of horizontal sections of the webpage, and "M" representing a number of vertical sections of the webpage;

detecting an input instruction according to user input;

confirming a selected magnification mode according to detection of the trigger instruction by the electronic device, in response to that the electronic device has detected the magnification instruction;

confirming a target area on the webpage to be magnified on the touch screen by dividing the webpage into the "N*M" sections according to a resolution "A*B" of the touch screen, "A" representing horizontal pixels of the resolution, "B" representing vertical pixels of the resolution; recording a trigger range for each of the sections according to ranges of the horizontal pixels and the vertical pixels on the touch screen of each section; confirming a selected section according to receiving an X coordinate value and a Y coordinate value of a touch point long pressed on the touch screen and the trigger range for each of the sections; confirming the selected section to be the target area, if the selected magnification mode is the automatic mode; or confirming the target area by recording successive coordinate values comprising X coordinate values and Y coordinate values of the touch screen according to a closed path drawn on the touch screen; displaying pixels on the touch screen that correspond to the successive coordinate values with a predetermined color; confirming a rectangular area according to a minimum value of X coordinate values, a maximum value of X coordinate values, a minimum value of Y coordinate values, and a maximum value of Y coordinate values from the recorded successive coordinate values, and confirming the rectangular area to be the target area, if the selected magnification mode is the manual mode;

magnifying content of the target area by displaying content of the target area on a full screen of the touch screen.

6. The storage medium as claimed in claim 5, further comprising:

defining a return instruction for returning to display the webpage before the target area is magnified on the touch screen.

7. The storage medium as claimed in claim 6, further comprising:

returning to display the webpage before the target area is magnified on the touch screen, in response to that the electronic device has detected the return instruction.

8. The storage medium as claimed in claim 6, wherein the selected magnification mode is confirmed by:

confirming that the selected magnification mode is the automatic mode, upon the condition that the electronic device has detected the trigger instruction for the automatic mode;

confirming that the selected magnification mode is the manual mode, upon the condition that the electronic device has detected the trigger instruction for the manual mode.

9. An electronic device, comprising:

a storage system;

a touch screen for displaying a webpage of the electronic device;

and a processor; and one or more programs that are stored in the storage system and are executed by the processor, the one or more programs comprising:

a setting module that defines a magnification instruction that allows for magnification of content of the webpage on the touch screen, trigger instructions for magnification modes, the magnification modes comprising an automatic mode and a manual mode;

the setting module further divides the webpage into the "N*M" sections, "N" representing a number of horizontal sections of the webpage, and "M" representing a number of vertical sections of the webpage;

a detection module that detects an input instruction according to user input;

a first confirmation module that confirms a selected magnification mode according to detection of the trigger instruction by the electronic device, upon the condition that the electronic device has detected the magnification instruction;

a second confirmation module that confirms a target area on the webpage to be magnified on the touch screen by dividing the webpage into the "N*M" sections according to a resolution "A*B" of the touch screen, "A" representing horizontal pixels of the resolution, "B" representing vertical pixels of the resolution; recording a trigger range for each of the sections according to ranges of the horizontal pixels and the vertical pixels on the touch screen of each section; confirming a selected section according to receiving an X coordinate value and a Y coordinate value of a touch point long pressed on the touch screen and the trigger range for each of the sections; confirming the selected section to be the target area, if the selected magnification mode is the automatic mode; or confirming the target area by recording successive coordinate values comprising X coordinate values and Y coordinate values of the touch screen according to a closed path drawn on the touch screen, displaying pixels on the touch screen that correspond to the successive coordinate values with a predetermined color; confirming a rectangular area according to a minimum value of X coordinate values, a maximum value of X coordinate values, a minimum value of Y coordinate values, and a maximum value of Y coordinate values from the recorded successive coordinate values, confirming the rectangular area to be the target area, if the selected magnification mode is the manual mode;

a magnification module that magnifies content of the target area by displaying content of the target area on a full screen of the touch screen.

10. The electronic device as claimed in claim 9, wherein the setting module further operable to define a return instruction for returning to display the webpage before the target area is magnified on the touch screen.

11. The electronic device as claimed in claim 10, wherein the one or more programs further comprises:

a recovery module that returns to display the webpage before the target area is magnified on the touch screen, in response to that the electronic device has detected the return instruction.

12. The electronic device as claimed in claim 11, wherein the first confirmation module confirms the selected magnification mode by:

confirming that the selected magnification mode is the automatic mode, upon the condition that the electronic device has detected the trigger instruction for the automatic mode;

confirming that the selected magnification mode is the manual mode, upon the condition that the electronic device has detected the trigger instruction for the manual mode.

* * * * *